United States Patent
Lim

(10) Patent No.: US 8,624,963 B2
(45) Date of Patent: Jan. 7, 2014

(54) STEREOSCOPIC IMAGE DISPLAY DEVICE AND METHOD FOR MANUFACTURING THE SAME

(75) Inventor: Kyong Ho Lim, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 251 days.

(21) Appl. No.: 13/151,697

(22) Filed: Jun. 2, 2011

(65) Prior Publication Data

US 2011/0298792 A1    Dec. 8, 2011

(30) Foreign Application Priority Data

Jun. 8, 2010    (KR) .................... 10-2010-0054009

(51) Int. Cl.
*G06T 15/00* (2011.01)
*H04N 13/04* (2006.01)

(52) U.S. Cl.
USPC .......................................... 348/51; 345/419

(58) Field of Classification Search
USPC .......................................... 345/419; 348/51
See application file for complete search history.

(56) References Cited

U.S. PATENT DOCUMENTS

| 6,799,859 | B1 | 10/2004 | Ida et al. | |
|---|---|---|---|---|
| 2007/0296877 | A1* | 12/2007 | Kang | 349/15 |
| 2008/0007835 | A1 | 1/2008 | Lim et al. | |
| 2009/0233102 | A1* | 9/2009 | Toyama et al. | 428/423.1 |
| 2009/0310216 | A1 | 12/2009 | Roh et al. | |
| 2010/0289884 | A1* | 11/2010 | Kang | 348/58 |
| 2011/0096568 | A1* | 4/2011 | Schattinger et al. | 362/613 |

FOREIGN PATENT DOCUMENTS

| CN | 101065693 A | 10/2007 |
|---|---|---|
| CN | 101097271 A | 1/2008 |
| CN | 101101844 A | 1/2008 |
| CN | 101604071 A | 12/2009 |
| KR | 10-2007-0122267 A | 12/2007 |

OTHER PUBLICATIONS

Office Action issued in related Korean Patent Application No. 10-2010-0054009 dated Oct. 22, 2012.
Office Action dated Jul. 26, 2013 from The State Intellectual Property Office of the People's Republic of China in Chinese Application No. 201110160248.0.

* cited by examiner

*Primary Examiner* — Dave Czekaj
*Assistant Examiner* — Tsion B Owens
(74) *Attorney, Agent, or Firm* — Morgan, Lewis & Bockius LLP

(57) ABSTRACT

Disclosed is a stereoscopic image display device and a method for manufacturing the same, which facilitates to improve picture quality and to realize wide viewing angle and high luminance of stereoscopic images by improving crosstalk of left-eye image and right-eye image, wherein the stereoscopic image display device comprises a display panel including lower and upper substrates which are bonded to each other, and are provided with a left-eye displaying area (LDA) for displaying a left-eye image of stereoscopic image, and a right-eye displaying area (RDA) for displaying a right-eye image of stereoscopic image; a light-guiding member formed in the upper substrate and overlapped with an interface between the left-eye displaying area (LDA) and the right-eye displaying area (RDA); and an optical-axis changing member formed on the upper substrate, wherein the optical-axis changing member includes a left-eye retarder corresponding to the left-eye displaying area, and a right-eye retarder corresponding to the right-eye displaying area.

14 Claims, 5 Drawing Sheets

STEREOSCOPIC IMAGE DISPLAY DEVICE AND METHOD FOR MANUFACTURING THE SAME

CROSS REFERENCE TO RELATED APPLICATIONS

This application claims the benefit of the Korean Patent Application No. 10-2010-0054009 filed on Jun. 8, 2010, which is hereby incorporated by reference as if fully set forth herein.

BACKGROUND OF THE INVENTION

1. Field of the Invention

The present invention relates to a stereoscopic image display device, and more particularly, to a stereoscopic image display device which facilitates to realize good picture quality, wide viewing angle, and good luminance by preventing crosstalk of left-eye image and right-eye image.

2. Discussion of the Related Art

With development of information society, a display device is faced with requirement for a large size and a thin profile. In order to satisfy these requirements, there is the explosive increase for various kinds of flat type display devices having advantages of thin profile, lightness in weight, and low power consumption.

The flat type display device may include a liquid crystal display device (LCD), a plasma display panel (PDP), a field emission display device (FED), a light-emitting diode display device (LED), and etc. Among the various flat panel display devices, the LCD device is widely used owing to various advantages, for example, technical development for the mass production, easiness of driving means, low power consumption, and high-quality resolution.

Recently, a user's demand for a stereoscopic image is rapidly increased so that a stereoscopic image display device capable of displaying 3D (3-dimensional) image as well as 2D (2-dimensional) image is actively developed.

The stereoscopic image display device makes left-eye image and right-eye image with a binocular parallax separately seen in both eyes of a user. That is, the stereoscopic image display device makes the left-eye image recognized only in the user's left eye, and also makes the right-eye image recognized only in the user's right eye, whereby the user can watch the stereoscopic 3D image.

However, in case of the related art stereoscopic image display device, the left-eye image expected to be seen in the user's left eye might be recognized in the user's right eye, or the right-eye image expected to be seen in the user's right eye might be recognized in the user's left eye. Thus, the related art stereoscopic image display device may have a problem of low picture quality due to crosstalk of the left-eye image and right-eye image.

SUMMARY OF THE INVENTION

Accordingly, the present invention is directed to a stereoscopic image display device and a method for manufacturing the same that substantially obviates one or more problems due to limitations and disadvantages of the related art.

An advantage of the present invention is to provide a stereoscopic image display device which facilitates to improve picture quality and to realize wide viewing angle and high luminance of stereoscopic images by improving crosstalk of left-eye image and right-eye image.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided a stereoscopic image display device comprising: a display panel including lower and upper substrates which are bonded to each other, and are provided with a left-eye displaying area (LDA) for displaying a left-eye image of stereoscopic image, and a right-eye displaying area (RDA) for displaying a right-eye image of stereoscopic image; a light-guiding member formed in the upper substrate and overlapped with an interface between the left-eye displaying area (LDA) and the right-eye displaying area (RDA); and an optical-axis changing member formed on the upper substrate, wherein the optical-axis changing member includes a left-eye retarder corresponding to the left-eye displaying area, and a right-eye retarder corresponding to the right-eye displaying area.

At this time, the light-guiding member reflects the right-eye image, which is transmitted through the right-eye displaying area and is advanced to the left-eye retarder, toward the right-eye retarder; and also reflects the left-eye image, which is transmitted through the left-eye displaying area and is advanced to the right-eye retarder, toward the left-eye retarder.

Also, the light-guiding member is hollowly formed from the upper surface of the upper substrate in such a manner that a thickness of the light-guiding member is more than a half of an entire thickness of the upper substrate.

In another aspect of the present invention, there is provided a method for manufacturing a stereoscopic image display device comprising: preparing a display panel including lower and upper substrates which are bonded to each other, and are provided with a left-eye displaying area (LDA) for displaying a left-eye image of stereoscopic image, and a right-eye displaying area (RDA) for displaying a right-eye image of stereoscopic image; forming a light-guiding member overlapped with an interface between the left-eye displaying area (LDA) and the right-eye displaying area (RDA) in the upper substrate; adhering an upper polarizing plate to a front surface of the upper substrate including the light-guiding member; and forming an optical-axis changing member on the upper substrate, wherein the optical-axis changing member includes a left-eye retarder corresponding to the left-eye displaying area, and a right-eye retarder corresponding to the right-eye displaying area.

At this time, the light-guiding member is hollowly formed from the upper surface of the upper substrate in such a manner that a thickness of the light-guiding member is more than a half of an entire thickness of the upper substrate.

The process for forming the light-guiding member in the upper substrate comprises forming a light reflecting layer of aluminum or silicon in the light-guiding member.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the exemplary embodiments of the present invention, examples of which are illustrated in the accompanying drawings. Wherever possible, the same reference numbers will be used throughout the drawings to refer to the same or like parts.

Hereinafter, a stereoscopic image display device according to the present invention and a method for manufacturing the same will be described with reference to the accompanying drawings.

Figure 1:
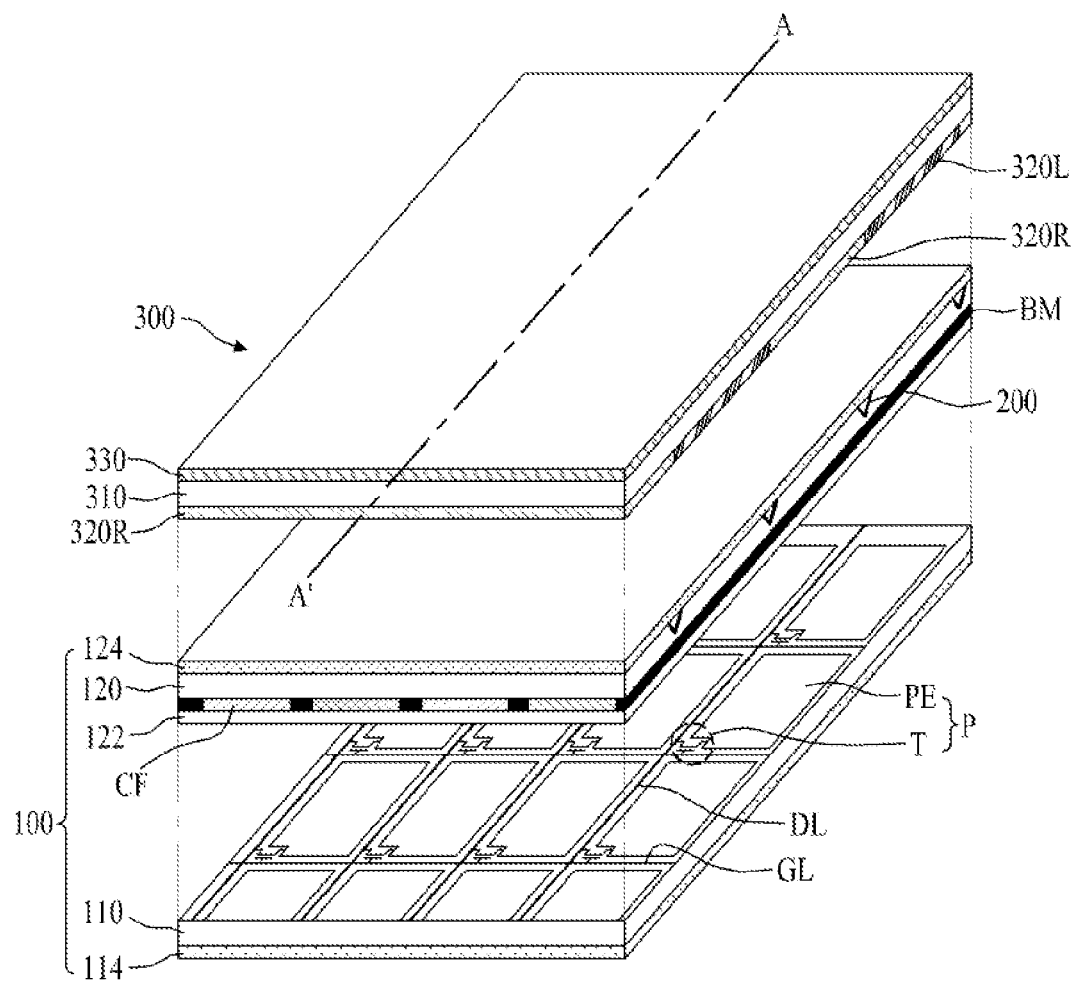
FIG. 1 illustrates a stereoscopic image display device according to the first embodiment of the present invention.
Figure 2:
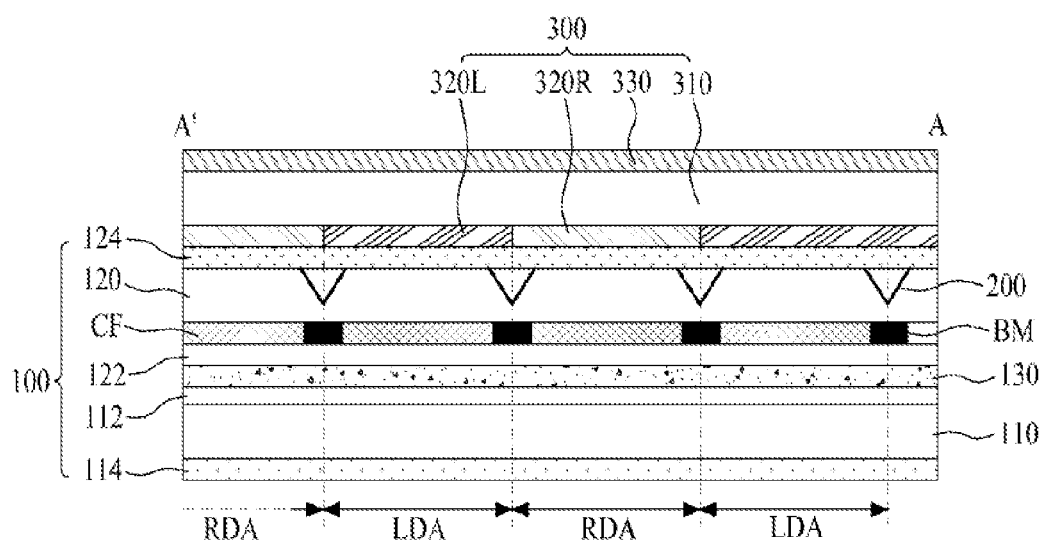
FIG. 2 is a cross section view along A-A' of FIG. 1.

FIG. 1 illustrates a stereoscopic image display device according to the first embodiment of the present invention. FIG. 2 is a cross section view along A-A' of FIG. 1.

Referring to FIGS. 1 and 2, the stereoscopic image display device according to the first embodiment of the present invention comprises a display panel 100, a light-guiding member 200, and an optical-axis changing member 300.

The display panel 100 comprises a lower substrate 110 and an upper substrate 120 which are bonded to each other, and are provided with a left-eye displaying area (LDA) for displaying a left-eye image of stereoscopic image, and a right-eye displaying area (RDA) for displaying a right-eye image of stereoscopic image. At this time, the lower substrate 110 and the upper substrate 120 are bonded to each other with a liquid crystal layer 130 interposed therebetween.

On the lower substrate 110, there is a thin film transistor array 112 which includes a plurality of gate lines (GL), a plurality of data lines (DL), and a plurality of pixels (P).

The plurality of gate lines (GL) are arranged at fixed intervals in a first direction of the lower substrate 110, wherein the plurality of gate lines (GL) are supplied with a gate signal from the external.

The plurality of data lines (DL) are arranged at fixed intervals in a second direction of the lower substrate 110, wherein the second direction is perpendicular to the first direction. The plurality of data lines (DL) are supplied with a data signal from the external. At this time, the data signal may correspond to a two-dimensional image (2D image) in a 2D image mode; or may correspond to the left-eye image and right-eye image in a stereoscopic image mode.

Each of the plurality of pixels (P) is formed every pixel region defined by crossing the gate lines (GL) and data lines (DL) to each other. Each pixel (P) comprises a thin film transistor (T) which is connected with the data line (DL) adjacent to the neighboring gate line (GL); a pixel electrode (PE) which is connected with the thin film transistor (T); and a common electrode (not shown) which faces with the pixel electrode (PE).

As the thin film transistor (T) is switched-on in accordance with the gate signal supplied from the gate line (GL), the data signal supplied from the data line (DL) is supplied to the pixel electrode (PE).

The pixel electrode (PE) forms an electric field depending on the data signal supplied through the thin film transistor (T), to thereby control transmittance of light passing through the liquid crystal layer 130.

The common electrode is formed between each of the pixel electrodes (PE) while being provided at a predetermined interval from the pixel electrode (PE). The common electrode is supplied with a reference voltage from the external. At this time, the common electrode may be formed on the upper substrate 120 being faced with the pixel electrode (PE) instead of the lower substrate 110.

For the stereoscopic image mode, each horizontal line corresponding to a longitudinal direction of the gate line (GL) is divided into the left-eye displaying area (LDA) for displaying the left-eye image of the stereoscopic image, and the right-eye displaying area (RDA) for displaying the right-eye image of the stereoscopic image. For example, among the horizontal lines for the stereoscopic image mode, the odd-numbered horizontal line is set as the left-eye displaying area (LDA) to display the left-eye image, and the even-numbered horizontal line is set as the right-eye displaying area (RDA) to display the right-eye image.

The lower substrate 110 drives the respective pixels (P) in accordance with the gate signal supplied to the gate line (GL), and the data signal corresponding to the 2D image data or 3D (left-eye and right-eye) image data supplied to the data line (DL), to thereby control the transmittance of light through the liquid crystal layer 130.

On the upper substrate 120, there are a plurality of color filters (CF), a black matrix (BM), and an overcoat layer 122.

The plurality of color filters (CF) include red (R), green (G), and blue (B) color filters which correspond to the plurality of pixels (P). The red (R), green (G), and blue (B) color filters and the corresponding red, green, and blue pixels (P) constitute a unit pixel for displaying a color image. The plurality of color filters (CF) may be arranged in such a manner that the different kinds of the color filters (CF) may be repetitively provided along a longitudinal direction of the gate line (GL), and the same kind of the color filters (CF) may be repetitively provided along a longitudinal direction of the data line (DL).

The black matrix (BM) is formed along the interfaces of the color filters (CF), thereby defining the plurality of color filters (CF), and optically separating the adjacent color filters (CF) from one another.

The overcoat layer 122 with a predetermined thickness is formed on an entire rear surface of the upper substrate 120 including the plurality of color filters (CF) and black matrix (BM), to thereby planarize the rear surface of the upper substrate 120 facing toward the lower substrate 120. An alignment film (not shown) for aligning the liquid crystal layer 130 may be formed on the overcoat layer 122.

The display panel 100 may further comprise a lower polarizing plate 114 and an upper polarizing plate 124.

The lower polarizing plate 114 is adhered to the rear surface of the lower substrate 110, that is, the surface facing toward a backlight unit (not shown), whereby the light emitted from the backlight unit and being incident on the lower substrate 110 is polarized by the lower polarizing plate 114.

The upper polarizing plate 124 is formed on a front surface of the upper substrate 120, that is, the surface which is not in contact with the liquid crystal layer 130, thereby polarizing the light transmitting through the upper substrate 120.

For the stereoscopic image mode, the left-eye image of the stereoscopic image is displayed on the left-eye displaying area (LDA) of the display panel 100, and the right-eye image of the stereoscopic image is displayed on the right-eye displaying area (RDA) of the display panel 100.

The light-guiding member 200 is formed on the upper substrate 120 while being overlapped with the interface between the left-eye displaying area (LDA) and the right-eye displaying area (RDA), whereby the light-guiding member 200 reflects the light incident at a predetermined angle. The light-guiding member 200 reflects the light which is transmitted at a predetermined angle via the left-eye displaying area (LDA) and is advanced toward the upper side of the right-eye displaying area (RDA), whereby the reflected light is advanced toward the upper side of the left-eye displaying area (LDA). Also, the light-guiding member 200 reflects the light which is transmitted at a predetermined angle via the right-eye displaying area (RDA) and is advanced toward the upper side of the left-eye displaying area (LDA), whereby the reflected light is advanced toward the upper side of the right-eye displaying area (RDA).

Also, the light-guiding member 200 collects the light passing through the left-eye displaying area (LDA) and the right-eye displaying area (RDA), to thereby improve the luminance of the stereoscopic image.

Figure 3:
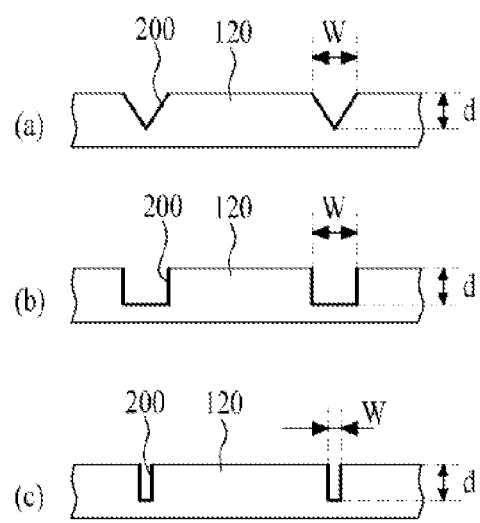
FIG. 3 illustrates a light-guiding member shown in FIGS. 1 and 2.

As shown in (a) of FIG. 3, the light-guiding member 200 according to the first embodiment of the present invention is hollowly formed from the upper surface of the upper substrate 120, wherein the light-guiding member 200 has a triangular-shaped or V-shaped cross section. Preferably, a depth (d) of the light-guiding member 200 is more than a half of an entire thickness of the upper substrate 120. Preferably, a width (W) of the light-guiding member 200 may be the same as or larger than a width of the black matrix (BM), but not necessarily. For optimizing efficiency of the device, the depth and width of the light-guiding member 200 may be appropriately changed based on the size and structure of the display panel 100.

As shown in (b) of FIG. 3, the light-guiding member 200 according to the second embodiment of the present invention is hollowly formed from the upper surface of the upper substrate 120, wherein the light-guiding member 200 has a square-shaped cross section. Preferably, a depth (d) of the light-guiding member 200 is more than a half of an entire thickness of the upper substrate 120. Preferably, a width (W) of the light-guiding member 200 may be the same as or larger than a width of the black matrix (BM), but not necessarily. For optimizing efficiency of the device, the depth and width of the light-guiding member 200 may be appropriately changed based on the size and structure of the display panel 100.

As shown in (c) of FIG. 3, the light-guiding member 200 according to the third embodiment of the present invention is hollowly formed from the upper surface of the upper substrate 120, wherein the light-guiding member 200 has a rectangle-shaped cross section. Preferably, a depth (d) of the light-guiding member 200 is more than a half of an entire thickness of the upper substrate 120. Preferably, a width (W) of the light-guiding member 200 may be smaller than a width of the black matrix (BM).

The light-guiding member 200 may be hollowly formed from the surface of the upper substrate 120 by a physical etching process or chemical etching process using a mask (not shown). At this time, the physical etching process may be a sand-blasting process; and the chemical etching process may be a dry-etching process or wet-etching process. A process for forming the light-guiding member 200 is carried out before a process for adhering the upper polarizing plate 124 after a process for bonding the lower substrate 110 and the upper substrate 120 to each other.

In FIGS. 1 and 2, the optical-axis changing member 300 divides the light incident via the left-eye displaying area (LDA) and right-eye displaying area (RDA) defined in the display panel 100 into the left-eye image and right-eye image having the different optical axes. For this, the optical-axis changing member 300 may comprise a base member 310, a left-eye retarder 320L, a right-eye retarder 320R, and a reflection preventing film 330.

The base member 310 may be formed of glass or film with a predetermined thickness.

The left-eye retarder 320L is formed on a rear surface of the base member 310 while being corresponding to the left-eye displaying area (LDA) defined in the display panel 100. The left-eye retarder 320L is positioned on the upper polarizing plate 124. The left-eye retarder 320L changes the optical axis of the light which is incident via the left-eye displaying area (LDA), whereby the left-eye image of the stereoscopic image is provided to the viewer's left eye for the stereoscopic image mode. At this time, the left-eye retarder 320L may change the light incident via the left-eye displaying area (LDA) to the left-handed polarized light.

The right-eye retarder 320R is formed on the rear surface of the base member 310 while being corresponding to the right-eye displaying area (RDA) defined in the display panel 100 and being in parallel to the left-eye retarder 320L. At this time, the right-eye retarder 320R is formed between each of the left-eye retarders 320L, and is positioned on the upper polarizing plate 124. The right-eye retarder 320R changes the optical axis of the light which is incident via the right-eye displaying area (RDA), whereby the right-eye image of the stereoscopic image is provided to the viewer's right eye for the stereoscopic image mode. At this time, the right-eye retarder 320R may change the light incident via the right-eye displaying area (RDA) to the right-handed polarized light.

The reflection preventing film 330 may be adhered to or coated onto the front surface of the base member 310, thereby decreasing the surface reflection, and removing the light interference or scattering by the reflected light.

The aforementioned optical-axis changing member 300 may be adhered to the front surface of the upper polarizing plate 124 by an adhesive material (not shown).

Figure 4:
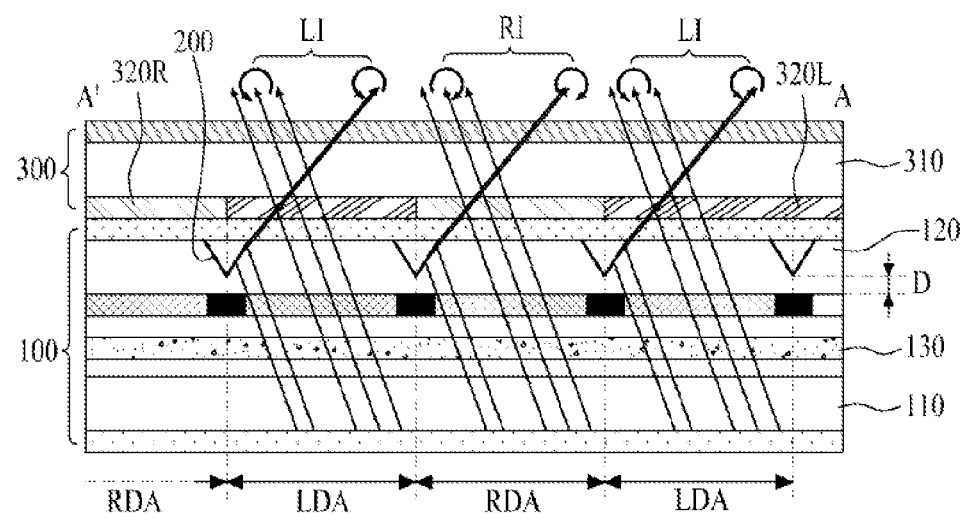
FIG. 4 illustrates a processing path in both left-eye image and right-eye image depending on light reflection of a light-guiding member according to the embodiment of the present invention.

As shown in FIG. 4, in case of the stereoscopic image display device according to the first embodiment of the present invention, the light-guiding member 200 reflects the right-eye image (RI), which is transmitted via the right-eye displaying area (RDA) and is then advanced toward the adjacent left-eye retarder 320L, toward the right-eye retarder 320R; and simultaneously reflects the left-eye image (LI), which is transmitted via the left-eye displaying area (LDA) and is then advanced toward the adjacent right-eye retarder 320R, toward the left-eye retarder 320L.

In the stereoscopic image display device according to the first embodiment of the present invention, the light-guiding member 200 is formed on the upper substrate 120 while being overlapped with the interface between the left-eye displaying area (LDA) and the right-eye displaying area (RDA), thereby improving picture quality by preventing crosstalk in the left-eye image and right-eye image of the stereoscopic image, and realizing the wide vertical (up-and-down) viewing angle of the stereoscopic image. Generally, the vertical viewing angle of the stereoscopic image is generally determined by an interval between the rear surface of the upper substrate 120 and the retarders 320L and 320R, and the width of the black matrix (BM), which is typically about 30°. Meanwhile, the vertical viewing angle of the stereoscopic image according to the present invention is determined by the width of the black matrix (BM), and an interval (D) between the rear surface of the upper substrate 120 and the light-guiding member 200 by the light collection of the light-guiding member 200. Accordingly, the vertical viewing angle of the stereoscopic image according to the present invention may be increased depending on the depth (d) of the light-guiding member 200, which might be above 60°.

Figure 5:
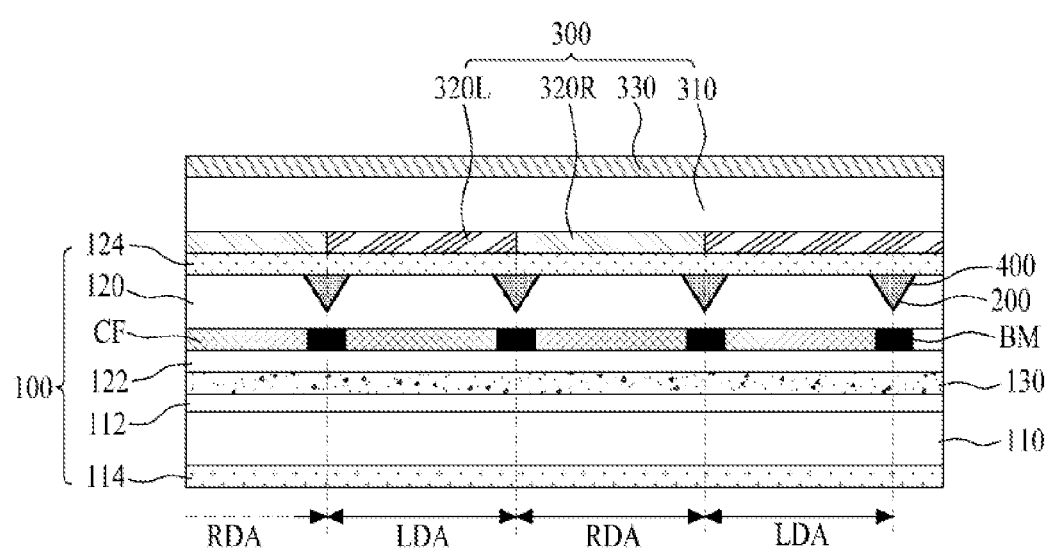
FIG. 5 is a cross section view illustrating a stereoscopic image display device according to the second embodiment of the present invention.

FIG. 5 is a cross section view illustrating a stereoscopic image display device according to the second embodiment of the present invention, which is a cross section view along A-A' of FIG. 1.

Referring to FIG. 5, the stereoscopic image display device according to the second embodiment of the present invention comprises a display panel 100, a light-guiding member 200, an optical-axis changing member 300, and a light reflecting layer 400. Except a structure of the light reflecting layer 400, the stereoscopic image display device according to the second embodiment of the present invention is identical in structure to the stereoscopic image display device according to the first embodiment of the present invention, whereby a detailed explanation for the same parts 100, 200, and 300 will be omitted, and a same reference numbers will be used throughout the drawings to refer to the same or like parts.

The light reflecting layer 400 is formed inside the light-guiding member 200 which is hollowly formed from an upper surface of an upper substrate 120, wherein the light-guiding member 200 has a triangular-shaped or quadrangle-shaped cross section. Preferably, the light reflecting layer 400 is formed of a material with high reflectance, for example, aluminum or silicon. The light reflecting layer 400 reflects the light transmitting through the light-guiding member 200 toward the targeted retarder 320L or 320R, whereby the picture quality and luminance of the stereoscopic image can be improved owing to the high reflection efficiency in the light-guiding member 200.

FIGS. 6A to 6D illustrate a method for manufacturing the stereoscopic image display device according to the embodiment of the present invention.

A method for manufacturing the stereoscopic image display device according to the embodiment of the present invention will be described with reference to FIGS. 6A to 6D.

Figure 6A:
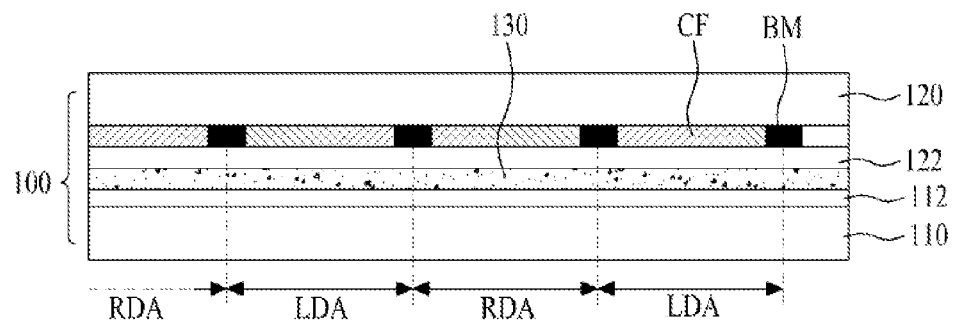
FIGS. 6A to 6D illustrate a method for manufacturing the stereoscopic image display device according to the embodiment of the present invention.

First, as shown in FIG. 6A, the display panel 100 is prepared, wherein the display panel 100 comprises the lower substrate 110 and the upper substrate 120 which are bonded to each other, and are provided with the left-eye displaying area (LDA) for displaying the left-eye image of stereoscopic image, and the right-eye displaying area (RDA) for displaying the right-eye image of stereoscopic image. On the lower substrate 110, there is the thin film transistor array 112 which includes the plurality of gate lines (not shown), the plurality of data lines (not shown), and the plurality of pixels (not shown). On the rear surface of the upper substrate 120, there is a color filter array which includes the plurality of color filters (CF) corresponding to the respective pixels of pixel regions defined by the black matrix (BM); and the overcoat layer formed flat at a predetermined thickness to cover the black matrix (BM) and the plurality of color filters (CF). The lower substrate 110 and the upper substrate 120 are bonded to each other with the liquid crystal layer 130 interposed therebetween.

Figure 6B:
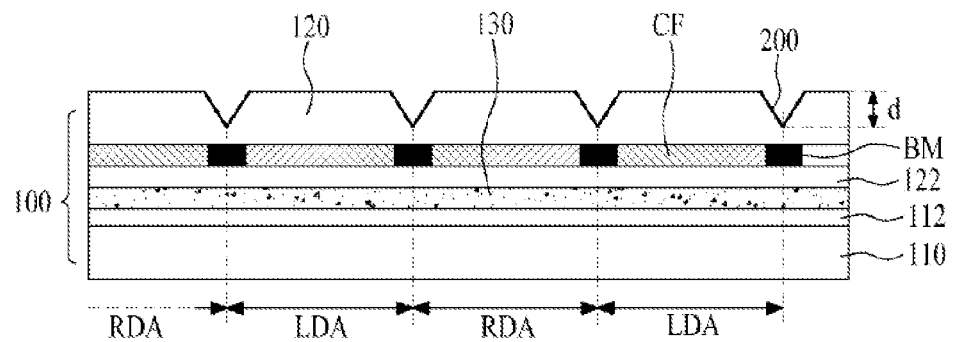

Then, as shown in FIG. 6B, the light-guiding member 200 is formed in the upper substrate 120, and more particularly, along the interface between the left-eye displaying area (LDA) and the right-eye displaying area (RDA). At this time, as shown in (a) to (c) of FIG. 3, the light-guiding member 200 is hollowly formed from the upper surface of the upper substrate 120, wherein the light-guiding member 200 has the triangular-shaped or quadrangle-shaped cross section. At this time, the light-guiding member 200 is hollowly formed in such a manner that the depth (d) of the light-guiding member 200 is more than a half of an entire thickness of the upper substrate 120. The light-guiding member 200 may be hollowly formed from the surface of the upper substrate 120 by the physical etching process or chemical etching process using the mask (not shown). At this time, the physical etching process may be the sand-blasting process; and the chemical etching process may be the dry-etching process or wet-etching process.

Figure 6C:
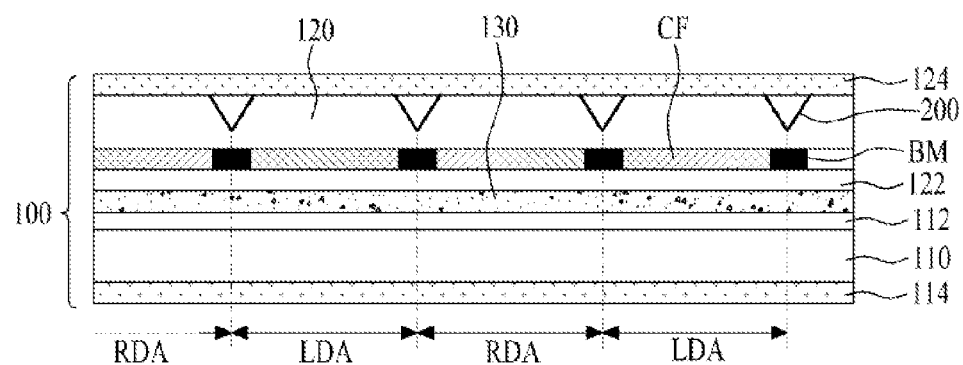

As shown in FIG. 6C, the lower polarizing plate 114 is adhered to the rear surface of the lower substrate 110; and the upper polarizing plate 124 is adhered to the front surface of the upper substrate 120 with the light-guiding member 200 formed therein.

Figure 6D:
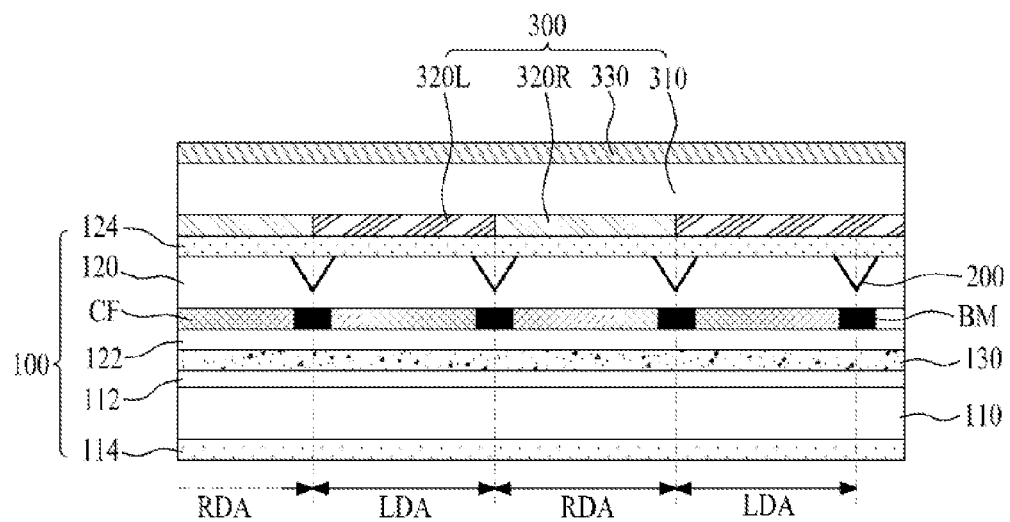

As shown in FIG. 6D, the optical-axis changing member 300 is provided on the upper substrate 120. At this time, the optical-axis changing member 300 may comprise the base member 310, the left-eye retarder 320L, the right-eye retarder 320R, and the reflection preventing film 330.

The base member 310 may be formed of glass or film with the predetermined thickness.

The left-eye retarder 320L is formed on the rear surface of the base member 310 while being corresponding to the left-eye displaying area (LDA). The left-eye retarder 320L changes the optical axis of the light which is incident via the left-eye displaying area (LDA), that is, makes the leftward polarization, whereby the left-eye image of the stereoscopic image is provided to the viewer's left eye for the stereoscopic image mode.

The right-eye retarder 320R is formed between each of the left-eye retarders 320L to be corresponding to the right-eye displaying area (RDA) while being in parallel with the left-eye retarder 320L. The right-eye retarder 320R changes the optical axis of the light which is incident via the right-eye displaying area (RDA), that is, makes the rightward polarization, whereby the right-eye image of the stereoscopic image is provided to the viewer's right eye for the stereoscopic image mode.

The reflection preventing film 330 may be adhered to or coated onto the front surface of the base member 310, thereby decreasing the surface reflection, and removing the light interference or scattering by the reflected light.

The aforementioned optical-axis changing member 300 may be adhered to the front surface of the upper polarizing plate 124 by the adhesive material (not shown).

Figure 7:
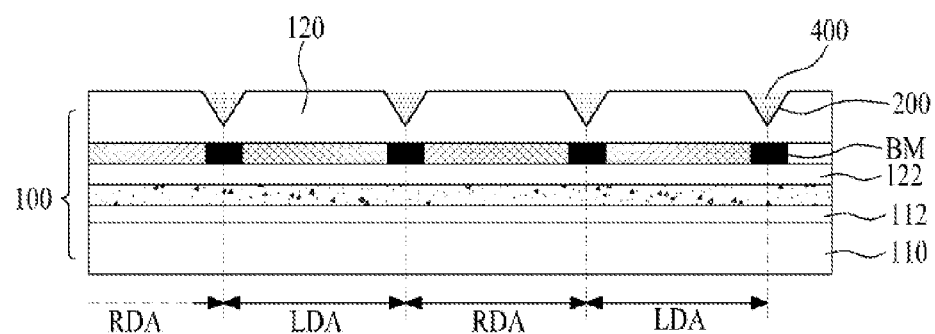
FIG. 7 illustrates a light reflecting layer in a light-guiding member after forming the light-guiding member shown in FIG. 6B.

For the manufacturing method of the stereoscopic image display device according to the embodiment of the present invention, as shown in FIG. 7, the process for forming the light-guiding member 200 in the upper substrate 120 may further comprise forming the light reflecting layer 400 inside the light-guiding member 200.

The light reflecting layer 400 is formed inside the light-guiding member 200 which is hollowly formed from the upper surface of the upper substrate 120, wherein the light-guiding member 200 has the triangular-shaped or quadrangle-shaped cross section. Preferably, the light reflecting layer 400 is formed of the material with high reflectance, for example, aluminum or silicon. The light reflecting layer 400 reflects the light transmitting through the light-guiding member 200 toward the targeted retarder 320L or 320R, whereby the picture quality and luminance of the stereoscopic image can be improved owing to the high reflection efficiency in the light-guiding member 200.

Figure 8:
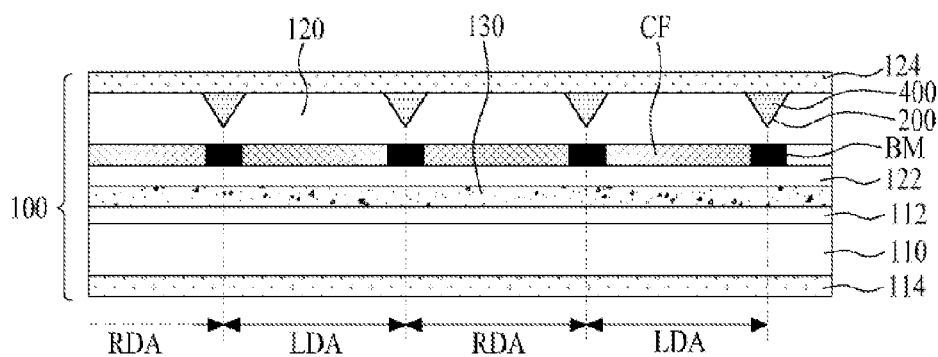
FIG. 8 illustrates an upper polarizing plate adhered to an upper substrate after forming the light reflecting layer shown in FIG. 7.

For the manufacturing method of the stereoscopic image display device according to the embodiment of the present invention, as shown in FIG. 8, the aforementioned upper polarizing plate 124 is adhered to the front surface of the upper substrate 120 with the light-guiding member 200 and the light reflecting layer 400 formed therein.

For the above explanation of the stereoscopic image display device according to the embodiment of the present invention and the method for manufacturing the same, the light-guiding member 200 is formed in the upper substrate 120 of the liquid crystal display panel 100, but not necessarily. However, the light-guiding member 200 may be formed in an upper substrate of another flat-type display panel instead of the liquid crystal display panel 100.

The stereoscopic image display device according to the embodiment of the present invention may be used for a mobile communication terminal, a notebook computer, a monitor, a television, a public display, and etc.

In the above stereoscopic image display device according to the present invention, the light-guiding member 200 is formed in the upper substrate 120 while being overlapped with the interface between the left-eye displaying area (LDA) and the right-eye displaying area (RDA).

This enables to improve the picture quality by preventing the crosstalk of the left-eye image and right-eye image of the stereoscopic image through the light reflection of the light-guiding member 200.

Also, it is possible to realize the wide vertical (up-and-down) viewing angle and good luminance of the stereoscopic image through the light collection of the light-guiding member 200.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A stereoscopic image display device comprising:
a display panel including lower and upper substrates which are bonded to each other, and are provided with a left-eye displaying area (LDA) for displaying a left-eye image of stereoscopic image, and a right-eye displaying area (RDA) for displaying a right-eye image of stereoscopic image; a light-guiding member formed in the upper substrate and overlapped with an interface between the left-eye displaying area (LDA) and the right-eye displaying area (RDA) for preventing crosstalk of left-eye image and right-eye image; and an optical-axis changing member formed on the upper substrate, wherein the optical axis changing member includes a left-eye retarder corresponding to the left-eye displaying area, and a right-eye retarder corresponding to the right-eye displaying area, wherein, the upper substrate of the display panel comprises a black matrix defining pixel regions for displaying the left-eye image and the right-eye image, and the light-guiding member is hollowly formed from the upper surface of the upper substrate to be overlapped with the black matrix in such a manner that a thickness of the light-guiding member is more than a half of an entire thickness of the upper substrate.

2. The stereoscopic image display device according to claim 1, wherein the light-guiding member reflects the right-eye image, which is transmitted through the right-eye displaying area and is advanced to the left-eye retarder, toward the right-eye retarder; and also reflects the left-eye image, which is transmitted through the left-eye displaying area and is advanced to the right-eye retarder, toward the left-eye retarder.

3. The stereoscopic image display device according to claim 1, wherein,
the upper substrate of the display panel comprises a black matrix defining pixel regions for displaying the left-eye image and the right-eye image, and
the light-guiding member having a triangular-shaped or quadrangle-shaped cross section is hollowly formed from the upper surface of the upper substrate to be overlapped with the black matrix.

4. The stereoscopic image display device according to claim 1, further comprising a light reflecting layer formed in the light-guiding member.

5. The stereoscopic image display device according to claim 4, wherein the light reflecting layer is formed of aluminum or silicon.

6. The stereoscopic image display device according to claim 1, wherein the display panel further comprises:
an upper polarizing plate adhered to a front surface of the upper substrate to cover the light-guiding member; and
a lower polarizing plate adhered to a rear surface of the lower substrate.

7. The stereoscopic image display device according to claim 6, wherein the optical-axis changing member comprises:
a base member of glass or film with a predetermined thickness; and
the left-eye retarder and right-eye retarder which are alternately formed on the rear surface of the base member facing the upper polarizing plate.

8. The stereoscopic image display device according to claim 7, wherein the optical-axis changing member further comprises a reflection preventing film on the front surface of the base member.

9. A method for manufacturing a stereoscopic image display device comprising:
preparing a display panel including lower and upper substrates which are bonded to each other, and are provided with a left-eye displaying area (LDA) for displaying a left-eye image of stereoscopic image, and a right-eye displaying area (RDA) for displaying a right eye image of stereoscopic image; forming a light-guiding member overlapped with an interface between the left-eye displaying area (LDA) and the right-eye displaying area (RDA) in the upper substrate of the display panel for preventing crosstalk of left-eye image and right-eye image; adhering an upper polarizing plate to a front surface of the upper substrate of the display panel including the light-guiding member; and forming an optical-axis changing member on the upper substrate of the display panel, wherein the optical-axis changing member includes a left-eye retarder corresponding to the left-eye displaying area, and a right-eye retarder corresponding to the right-eye displaying area, wherein, the upper substrate of the display panel comprises a black matrix defining pixel regions for displaying the left-eye image and the right-eye image, and the light-guiding member is hollowly formed from the upper surface of the upper substrate to be overlapped with the black matrix in such a manner that a thickness of the light-guiding member is more than a half of an entire thickness of the upper substrate.

10. The method according to claim 9, wherein, the upper substrate of the display panel comprises a black matrix defining pixel regions for displaying the left-eye image and the right-eye image, and the light-guiding member having a triangular-shaped or quadrangle-shaped cross section is hollowly formed from the upper surface of the upper substrate to be overlapped with the black matrix.

11. The method according to claim 9, wherein the light-guiding member is formed by a physical etching process or chemical etching process using a mask.

12. The method according to claim 9, wherein the process for forming the light-guiding member in the upper substrate comprises forming a light reflecting layer of aluminum or silicon in the light-guiding member.

13. A stereoscopic image display device comprising:
a display panel including lower and upper substrates which are bonded to each other, and are provided with a left-eye displaying area (LDA) for displaying a left-eye image of stereoscopic image, and a right-eye displaying area (RDA) for displaying a right-eye image of stereoscopic image; a light-guiding member formed in the upper substrate and overlapped with an interface between the left-eye displaying area (LDA) and the right-eye displaying area (RDA) for preventing crosstalk of left-eye image and right-eye image; and an optical-axis changing member formed on the upper substrate, wherein the optical axis changing member includes a left-eye retarder corresponding to the left-eye displaying area, and a right-eye retarder corresponding to the right-eye displaying area, wherein, the upper substrate of the display panel comprises a black matrix defining pixel regions for displaying the left-eye image and the right-eye image, and the light-guiding member having a triangular-shaped or quadrangle-shaped cross section is hollowly formed from the upper surface of the upper substrate to be overlapped with the black matrix.

14. A method for manufacturing a stereoscopic image display device comprising:
preparing a display panel including lower and upper substrates which are bonded to each other, and are provided with a left-eye displaying area (LDA) for displaying a left-eye image of stereoscopic image, and a right-eye displaying area (RDA) for displaying a right eye image of stereoscopic image; forming a light-guiding member overlapped with an interface between the left-eye displaying area (LDA) and the right-eye displaying area (RDA) in the upper substrate of the display panel for preventing crosstalk of left-eye image and right-eye image; adhering an upper polarizing plate to a front surface of the upper substrate of the display panel including the light-guiding member; and forming an optical-axis changing member on the upper substrate of the display panel, wherein the optical-axis changing member includes a left-eye retarder corresponding to the left-eye displaying area, and a right-eye retarder corresponding to the right-eye displaying area, wherein, the upper substrate of the display panel comprises a black matrix defining pixel regions for displaying the left-eye image and the right-eye image, and the light-guiding member having a triangular-shaped or quadrangle-shaped cross section is hollowly formed from the upper surface of the upper substrate to be overlapped with the black matrix.

* * * * *